Patented July 13, 1954

2,683,660

UNITED STATES PATENT OFFICE 2,683,660

HERBICIDAL COMPOSITIONS

Arthur H. Schlesinger, Dayton, Ohio, assignor to Monsanto Chemical Company, St. Louis, Mo., a corporation of Delaware No Drawing. Application February 10, 1953, Serial No. 336,191

9 Claims. (Cl. 71—2.7)

The present invention provides new and valuable compositions possessing highly selective herbicidal efficacy and methods of destroying or preventing plant growth in which such compositions are used.

I have found that improved, very efficient, selective herbicidal compositions are obtained when there are prepared oil-in-water emulsions of a dialkyl chloromaleate in which each alkyl radical has from 1 to 12 carbon atoms. Chloromaleates useful for the present purpose are the simple dialkyl esters such as methyl, ethyl, n-propyl, isopropyl, n-butyl, isoamyl, n-hexyl, 2-ethyl-hexyl, n-octyl, decyl or dodecyl chloromaleate or the mixed dialkyl esters, e. g., ethyl methyl chloromaleate, n-butyl ethyl chloromaleate, isohexyl n-propyl chloromaleate, n-propyl decyl chloromaleate, dodecyl 2-ethylhexyl chloromaleate, etc.

The present compositions are characterized by a high degree of selective efficacy in that even in very low concentration, e. g., in a concentration of as low as 0.3 per cent, they kill narrow-leafed plant growth but have no adverse effect on broad-leafed plants at the same or higher concentrations. They may thus be employed very advantageously for ridding truck crop fields, e. g., strawberries, beans, etc., of invading grasses such as cheat grass.

Herbicidal compositions containing the present chloromaleates are readily obtained by first preparing a solution thereof in an organic solvent and then adding the resulting solution to water containing an emulsifying agent to form an emulsion. Because of the very high herbicidal efficiency of the esters, they are present in the herbicidal composition in only very small concentrations, for example, in concentrations of from 0.1 per cent to 2 per cent by weight of the total weight of the emulsion. Emulsifying agents which may be employed are those customarily used in the art for the preparation of oil-in-water emulsions. Examples of emulsifying agents which may be used include alkylbenzenesulfonates, long chained polyalkylene glycols, long chained succinates, etc. The emulsions may be used to destroy already existing plant growth by direct application to the undesirable plants, e. g., by spraying, or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., oils, cinders, etc.

The present invention is further illustrated, but not limited, by the following examples:

Example 1

Spray testing of the present herbicidal compositions was conducted as follows:

Respective cyclohexanone solutions of various chloromaleates and related compounds and an emulsifying agent were added to water, the quantity of solution employed being calculated to give emulsions containing 1.0 per cent and 0.3 per cent by weight, respectively, of the compound to be tested, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three week old corn and bean plants were sprayed with the respective emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank specimens" of each plant were then allowed to remain under standard conditions of sunlight and watering for a period of one week. At the end of that time the sprayed plants were compared with the untreated plants in order to determine the extent of injury, if any. The following observations were made:

| Compound Tested at Percent Concentration | Extent[1] of Injury on— | |
|---|---|---|
| | Bean | Corn |
| Ethyl chloromaleate: | | |
| 0.3% | 0 | 4, 4a |
| 1.0% | 0 | 4, 4a |
| Amyl chloromaleate: | | |
| 0.3% | 1 | 3 |
| 1.0% | 2 | 4, 4a |
| Di-n-octyl chloromaleate: | | |
| 0.3% | 0 | 2 |
| 1.0% | 0 | 3 |
| Di-n-lauryl chloromaleate: | | |
| 0.3% | 0 | 0 |
| 1.0% | 1 | 3 |
| Di-n-butyl fumarate: | | |
| 0.3% | 0 | 0 |
| 1.0% | 1 | 1 |
| Di-n-octyl chlorofumarate: | | |
| 0.3% | 0 | 0 |
| 1.0% | 1 | 1 |
| Bis-(2-chloroethyl)fumarate: | | |
| 0.3% | 0 | 0 |
| 1.0% | 0 | 0 |
| Dimethyl maleate: | | |
| 0.3% | 0 | 0 |
| 1.0% | 1 | 1 |

[1] 0=No injury; 1=Slight injury; 2=Moderate injury; 3=Severe injury; 4=Plant dead; 4a=Leaves dried.

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of radish, buckwheat, wild oats, beet, cheat grass, mustard, rye grass and morning glory seeds, respectively, were prepared. The surface soil of the seeded boxes was then sprayed, respectively, with the 1.0 per cent ethyl chloromaleate emulsion of Example 1. The quantity of the emulsion which was applied was calculated to correspond to 50 lbs. of the chloromaleate per acre, 9.1 cc. of the 1.0 per cent emulsion per 25 sq. in. of surface soil being calculated to correspond to 50 lbs. of the chemical per acre. The sprayed boxes as well as similar seeded but unsprayed boxes were then maintained at standard conditions of temperature and watering for a period of two weeks. At the end of that time the number of healthy seedlings in each box was counted and the number of non-emerging and damaged seedlings was obtained by difference. This difference is designated as "X." "Per cent phytotoxicity" was determined by the ratio of "X" to the number of healthy seedlings in the controls.

There was thus evidenced a 71–100 per cent phytotoxicity to cheat grass, a 46–70 per cent phytotoxicity to radish and mustard, a 21–45 per cent phytotoxicity to buckwheat and morning glory and a 0–20 per cent phytotoxicity to wild oats, beets, and rye grass.

While the present esters are most advantageously employed as herbicides by incorporating them into an aqueous emulsion as herein described, they may also be employed in other plant-destroying methods. Thus they may be incorporated into solid carriers such as clay, talc, pumice and bentonite to give herbicidal compositions which may be applied to living plants or to surfaces which are to be freed from plant growth. The present chloromaleates may also be mixed with liquid or solid agricultural pesticides, e. g., insecticides and fungicides. While solutions of the esters in organic solvents may be employed for preventing and destroying plant growth, I have found that the emulsions possess an improved tendency to adhere to the treated surfaces and that less of the active ingredients, i. e., the dialkylchloromaleates, is required to give comparable herbicidal efficiency.

What I claim is:

1. A herbicidal composition comprising an oil-in-water emulsion of a dialkyl chloromaleate in which each alkyl radical has from 1 to 12 carbon atoms, said chloromaleate being present in said emulsion in a quantity which is toxic to plant life.

2. A herbicidal composition comprising an oil-in water emulsion of ethyl chloromaleate, said chloromaleate being present in said emulsion in a quantity which is toxic to plant life.

3. A herbicidal composition comprising an oil-in-water emulsion of amyl chloromaleate, said chloromaleate being present in said emulsion in a quantity which is toxic to plant life.

4. A herbicidal composition comprising an oil-in-water emulsion of lauryl chloromaleate, said chloromaleate being present in said emulsion in a quantity which is toxic to plant life.

5. The method of destroying undesirable plants which comprises applying to said plants a toxic quantity of a herbicidal composition containing as the essential active ingredient a dialkyl chloromaleate in which each alkyl radical has from 1 to 12 carbon atoms.

6. The method of destroying undesirable plants which comprises applying to said plants a toxic quantity of a herbicidal composition comprising an oil-in-water emulsion of a dialkyl chloromaleate in which each alkyl radical has from 1 to 12 carbon atoms.

7. The method of destroying undesirable plants which comprises applying to said plants a toxic quantity of an oil-in-water emulsion of ethyl chloromaleate.

8. The method of destroying undesirable plants which comprises applying to said plants a toxic quantity of an oil-in-water emulsion of amyl chloromaleate.

9. The method of destroying undesirable plants which comprises applying to said plants a toxic quantity of an oil-in-water emulsion of lauryl chloromaleate.

References Cited in the file of this patent

UNITED STATES PATENTS

| Number | Name | Date |
|--------|------|------|
| 2,603,560 | Stewart | July 15, 1952 |